Aug. 18, 1942.   J. A. MULLER ET AL   2,293,304
PLASTIC EXTRUSION MOLDING MACHINE
Filed May 14, 1937   5 Sheets-Sheet 1

INVENTOR
JOHAN A. MULLER
BY   WARREN R. TUCKER
Toulmin + Toulmin
ATTORNEYS

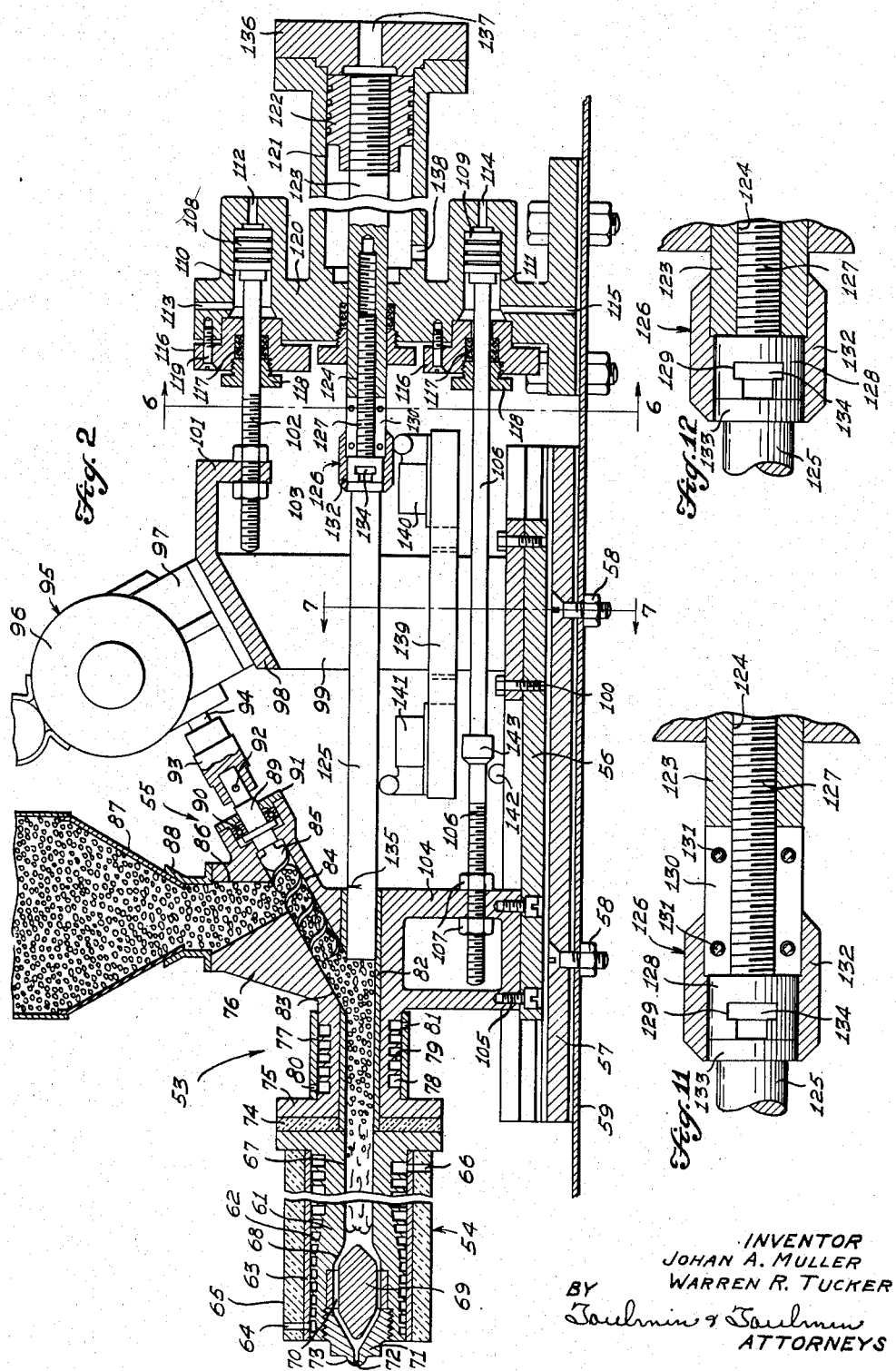

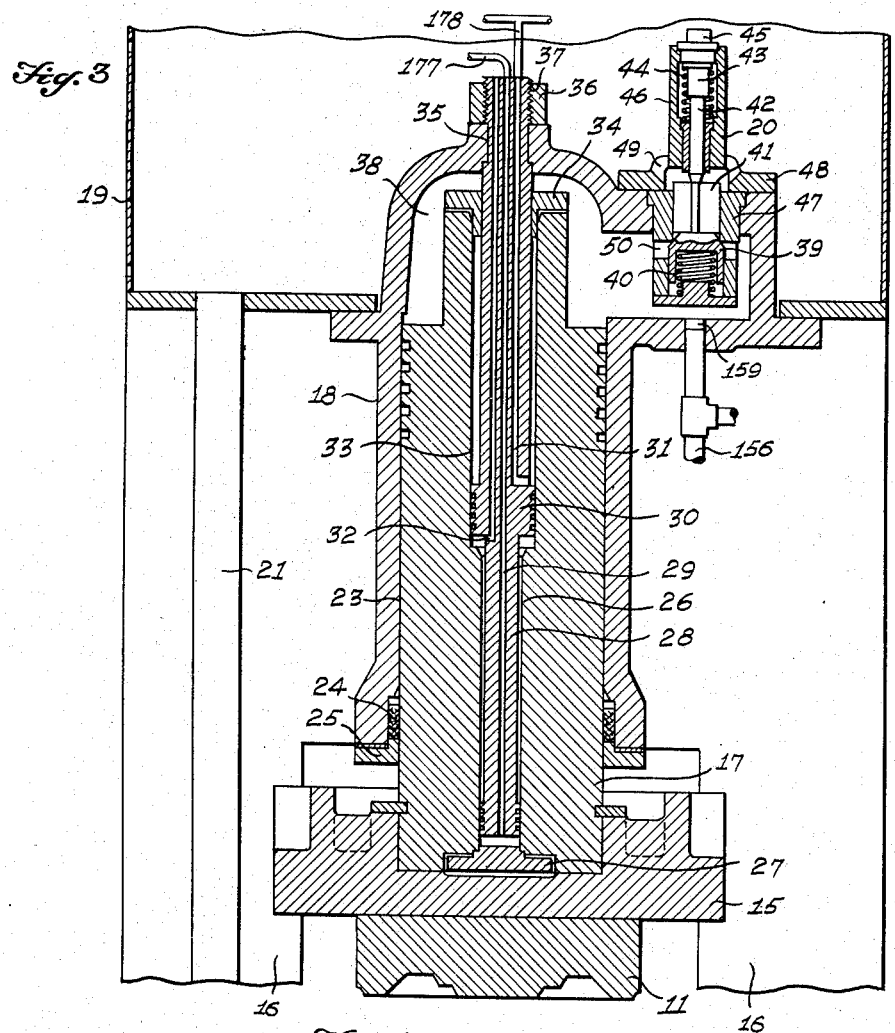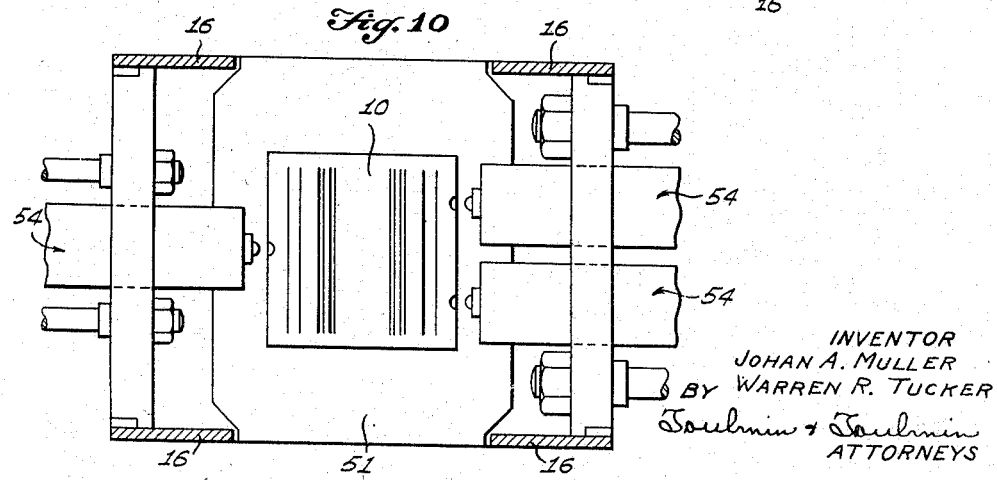

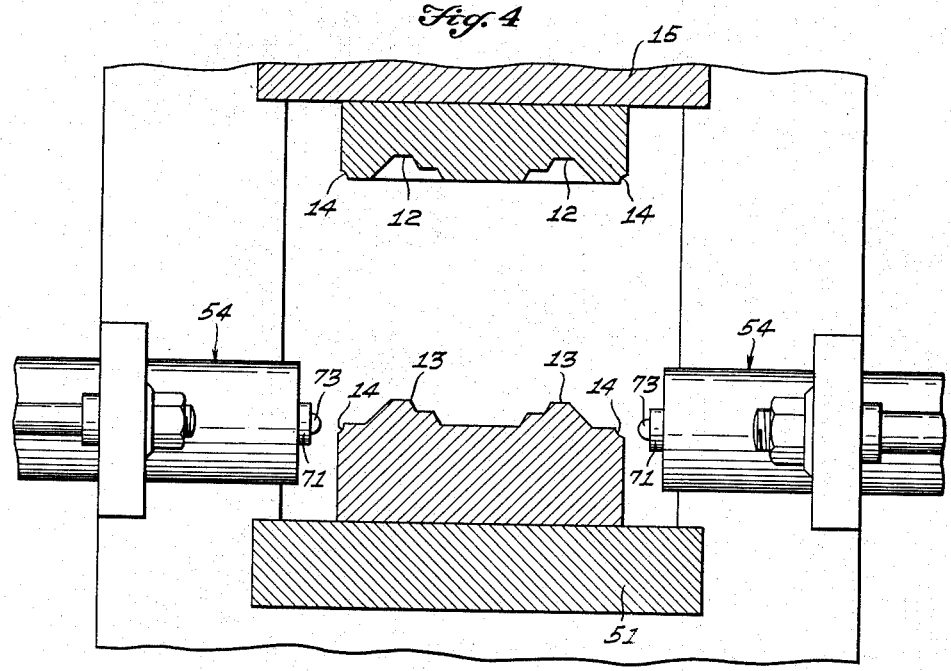
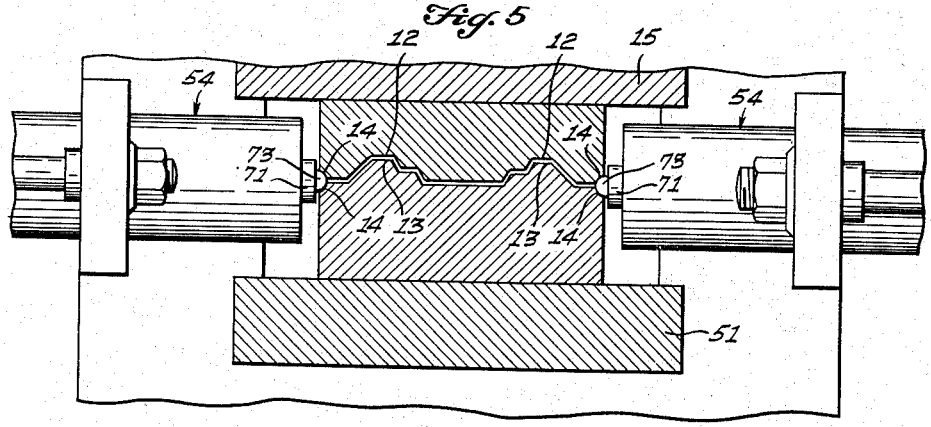

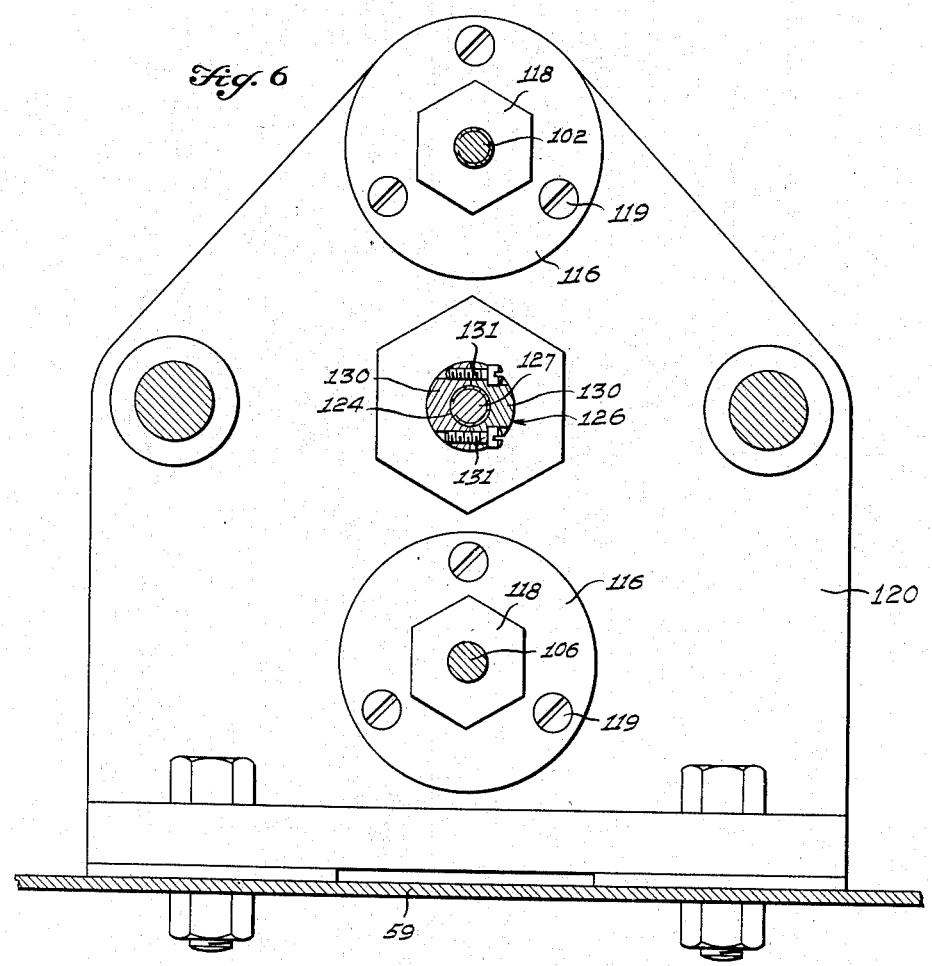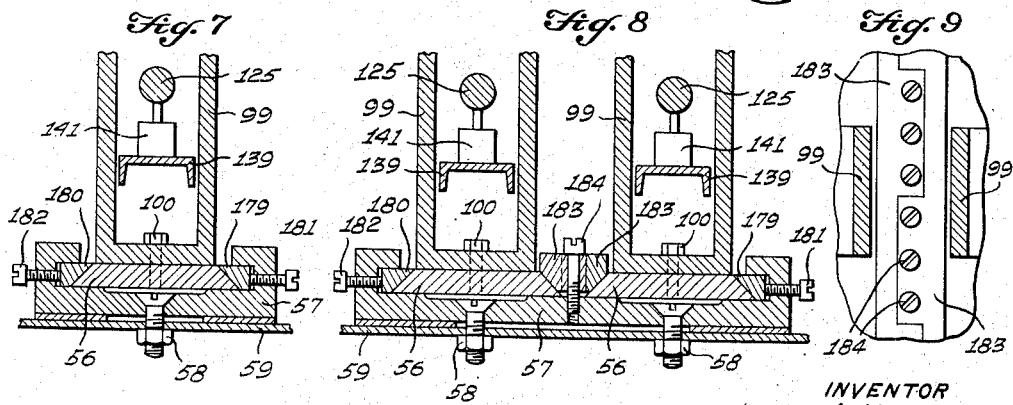

Patented Aug. 18, 1942

2,293,304

UNITED STATES PATENT OFFICE 2,293,304

PLASTIC EXTRUSION MOLDING MACHINE

Johan A. Muller, Mansfield, and Warren R. Tucker, Mount Gilead, Ohio, assignors to The Hydraulic Press Corp. Inc., Wilmington, Del., a corporation of Delaware Application May 14, 1937, Serial No. 142,674

6 Claims. (Cl. 18—30)

This invention relates to presses, and in particular, to plastic extrusion molding presses.

One object of this invention is to provide a press which is convertible at will into either a plastic extrusion molding press or into a compression press.

Another object is to provide a plastic extrusion molding press, wherein the injector is applied at the parting line of the dies.

Another object is to provide a plastic extrusion molding press, wherein a plurality of injectors is employed and applied at the parting line of the dies and on the sides thereof, thereby freeing the injector from the clamping pressure.

Another object is to provide a plastic extrusion molding press, wherein the injector or injectors are movable into and out of engagement with the closed dies at their parting lines, thereby enabling the injector or injectors to be withdrawn from the vicinity of the dies.

Another object is to provide a plastic extrusion molding press, wherein the molding material is injected at a plurality of points in the die or dies, thereby enabling the successful molding of larger pieces or pieces of different color simultaneously.

Another object is to provide a plastic extrusion molding press having a die-clamping plunger for closing and clamping the die halves, an injector being provided which engages the side of the die and is equipped with adapters to adapt the injector and its positioning means to different shapes and sizes of dies.

In the drawings:

Figure 2 is an enlarged vertical section through one of the feeding and injector assemblies shown in Figure 1.

Figure 3 is an enlarged central vertical section through the die-clamping plunger and its associated elements.

Figure 4 is an enlarged elevation, partly in section, showing the die halves separated and the injectors withdrawn therefrom.

Figure 5 is a view similar to Figure 4, but showing the die halves closed and the injectors in engagement therewith at the parting line.

Figure 6 is a vertical section along the line 6—6 of Figure 2.

Figure 7 is a vertical section along the line 7—7 of Figure 2.

Figure 8 is a modified view analogous to Figure 7, but showing a double injecting unit instead of a single one.

Figure 9 is an enlarged view showing the interconnection of the two injector assemblies of Figure 8.

Figure 10 is a horizontal section along the line 10—10 of Figure 1, showing the relationship of the injectors to the lower die half.

Figure 11 is an enlarged vertical section of a portion of Figure 2, showing the adapter devices between the injector plunger and the injector piston rod, with an adapter spacer inserted therein.

Figure 12 is a view similar to Figure 11, but with the adapter spacer removed.

General construction

Figure 1:
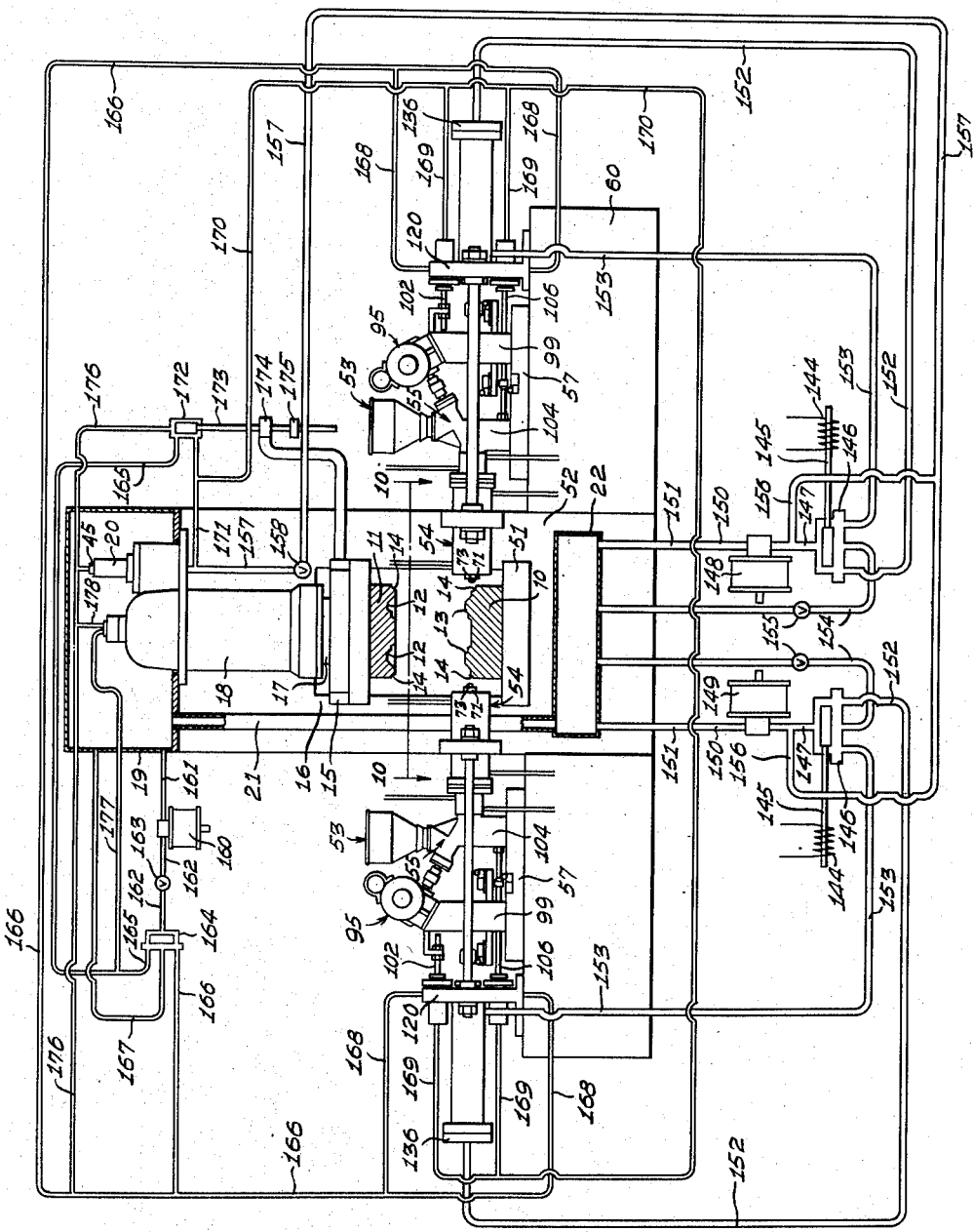
Figure 1 is a diagrammatic side elevation, partly in section, showing the machine as a whole with the die-clamping plunger, the feeding and injecting assemblies and the hydraulic circuits after actuation.

In general, the plastic extrusion molding machine or press of this invention consists of a pair of die halves adapted to be closed by a hydraulic plunger. These die halves, in cooperation, form a cavity connected by means of passageways to points on the parting line of the dies, where injectors are arranged to engage the dies. These injectors are mounted with their axes perpendicular to the axis of the die-clamping plunger, and are mounted upon slides with mechanism whereby they may be advanced or retracted from engagement with the dies. Suitable hydraulic plungers are provided for accomplishing this advancing or retracting motion of the injectors. Associated with the injectors is feeding mechanism for positively feeding the molding material to the injector. These various assemblies are operated by hydraulic pistons controlled by valves in a hydraulic circuit, shown in Figure 1.

Clamping plunger and press construction

Referring to the drawings in detail, Figure 1 shows diagrammatically a press or molding machine with a pair of cooperating die halves 10 and 11 having cavities 12 corresponding to projections 13, and communicating in their closed positions with inlets 14 for the nozzles of the injectors, as hereinafter described. The upper die half 11 is mounted upon a platen 15, which is guided for vertical reciprocation in frame guide members 16. Secured to the platen 15 is a main clamping plunger 17, operating in a main cylinder 18. Above the main cylinder 18 is a surge tank 19, containing a surge check valve 20. The surge tank 19 is connected by a vertical conduit 21 to an auxiliary tank 22 for supplying fluid to every portion of the circuit. The hydraulic circuit is subsequently described in more detail.

The main cylinder 18 (Figure 3) contains a cylinder bore 23 for reciprocably receiving the main plunger 17, a packing 24 and gland 25 being provided to prevent leakage therearound. The main plunger 17 is provided with a hollow central bore 26, having a head 27 closing the end thereof. Mounted within the bore 26 is a booster plunger 28, having a central passageway 29 therethrough. The booster plunger 28 is also provided with a piston head 30 and drilled passages 31 and 32 opening into the space on opposite sides of the head 30 within the cylinder bore 33 for receiving the head 30. Surrounding the main plunger 17 and closing the top of the cylinder bore 33 is an annular member 34. The booster plunger 28 is secured within the bore 35 of the head of the main cylinder 18 by means of the nut 36 threaded, as at 37, on the upper end of the booster plunger 17.

The surge check valve 20 is of a type known to those skilled in the art, and described and claimed in the patent to Ernst, No. 1,892,568, December 27, 1932, and its details form no part of the present invention. This valve 20 is provided for prefilling and emptying the upper chamber 38 of the main cylinder 18 in a manner more rapid than would otherwise be obtained. In brief, the surge check valve 20 consists of a movable valve member 39 urged upwardly by a spring 40 and engaging a fluted member 41, which in turn, engages a plunger 42 having a head 43 on the upper end thereof. A coil spring 44 surrounds the plunger 42 and urges it in an upward direction. A connection 45 with the casing 46 of the surge check valve 20 enables pressure fluid to be admitted to urge the plunger 42 downward to forcibly open the valve member 39 when pressure fluid is admitted to retract the main plunger. The valve member 39 is mounted in a cage 47, whereas the casing 46 is supported upon a fixture 48 having apertures 49 through which fluid may flow downwardly, past the fluted member 41 and valve member 39, through apertures 50, into the upper chamber 38 of the main cylinder 18.

*Feeding and injector units*

The feeding and injector units are arranged with their axes perpendicular to the direction of motion of the main plunger 17 (Figure 1), hence, the machine may be arranged either horizontally or vertically. For purposes of disclosure, a vertical machine is shown. The lower die member 10 is mounted upon a bed plate 51, supported by the bed 52 of the press. In this fixed position the die member 10 is aligned with the feeding and injector units, generally designated 53. Each feeding and injector unit consists of an injector, generally designated 54, and a feeding device, generally designated 55. Each feeding and injector unit 53 (Figure 2) is mounted upon a slide 56, which engages a guide plate 57 bolted, as at 58, to the plate 59, mounted upon the base 60. The injector 54 consists of a central cylinder 61 having radiating fins 62 engaging an outer casing 63 so as to form a chamber therebetween for the circulation of a heating agent, such as heated oil. This oil enters by a passageway 64 in an insulating wall 65, and leaves by a similar passageway 66 (Figure 2). The injector cylinder 61 contains a bore 67 with an enlargement 68 containing a spindle-shaped deflector 69, having passages 70 for the passage of the plastic material.

Beyond the enlargement 68 and the deflector 69 is a nozzle 71 having an orifice 72 in a rounded tip 73. The injector cylinder 61 is spaced by means of an insulation disc 74 from a flanged portion 75 of the feed casing 76. The latter is surrounded by a cylindrical wall 77, thereby providing a chamber 78, subdivided by annular fins 79 and having ports 80 and 81 for the admission and discharge of a cooling fluid. The purpose of this cooling fluid is to prevent the premature softening of the molding material before it reaches the injector chamber 67, thereby preventing the clogging of the feeding mechanism.

Within the feed casing is a sleeve 82 having an aperture 83 communicating with an inclined feed bore 84, with a rotary feed screw 85 therein. A conical throat 86 admits molding material, in the form of small particles, to the feed bore 84 from the feed hopper 87, supported in the holder 88 (Figure 2). The feed screw 85 is connected to a shaft 89 mounted on anti-friction bearings 90, held in place by the retaining plate 91. The shaft 89 is connected by the pin 92 to the coupling 93 on the output shaft 94 of the geared motor unit, generally designated 95. The latter consists of a motor 96 connected to a reduction gear box 97, by which the speed of the motor is reduced to the slow speed necessary for operating the feed screw 85. The geared motor unit 95 is mounted upon a support 98, with a post 99 secured to the slide 56 by the bolts 100.

The support 98 is provided with an angled portion 101, to which the piston rod 102 is secured by means of the nuts 103 threaded thereon. Similarly, the feed casing 76 has a downwardly extending post 104, bolted as at 105, to the slide 56 and connected to the piston rod 106 by the nuts 107 threaded on the end thereof. The piston rods 102 and 106 terminate in piston heads 108 and 109, respectively, reciprocable in cylinder bores 110 and 111. At their opposite ends these cylinder bores are provided with passages 112 and 113, also 114 and 115, respectively, (Figure 2). Surrounding the piston rods 102 and 106 are the closure plates 116, having packings 117 compressed by glands 118 for the prevention of leakage. The closure plates 116 are bolted, as at 119, to the cylinder blocks 120 containing the cylinder bores 110 and 111. The cylinder block 120 also contains an injector cylinder bore 121, with a piston head 122 mounted on a piston rod 123, the opposite end of which is provided with a threaded bore 124.

The piston rod 123 is connected to the injector plunger 125 by a coupling, generally designated 126. This coupling is arranged to permit the distance between the injector plunger 125 and the piston rod 123 to be lengthened or shortened, according to the size of the dies 10 and 11. For this purpose an adapter screw 127 (Figures 11 and 12) is threaded into the threaded bore 124, and is provided with a head 128 with a T-slot 129. Between the end of the piston rod 123 and the slotted head 128 is placed a split ring 130, the halves of which are held together by the cap screws 131. Surrounding the slotted head 128 and the split ring 130 is a collar 132 for additionally retaining the various portions and holding them together. The injector plunger 125 is provided with a flanged enlargement 133, with a T-shaped projection 134 fitting into the slot 129. In order to make use of this coupling device 126, the injector plunger 125 is provided with an index marker 135, which exactly registers with the outer end of the sleeve 82 when the injector plunger 125 is in its retracted position at the outer edge of the aperture 83.

If the dies 10 and 11 are now increased in size, the nuts 103 and 107 are loosened on the piston rods 102 and 106, and the feeding assembly slid back to the proper distance to accommodate the tip 73 of the nozzle 71 to the increased size of die. The injector plunger 125 is now uncoupled from the piston rod 123 and readjusted so that the index marker 135 again comes exactly at the outer end of the sleeve 82, the split ring 130 being removed by removing the cap screws 131. The split ring 130 is then replaced by a shorter split ring, and the assembly clamped together again in the manner shown in Figure 11. By supplying split rings 130 in various lengths, the apparatus can be adapted to dies of varying sizes. When the split ring 130 is entirely removed and the coupling 126 reassembled, the apparatus is adjusted for the maximum permissible size of die, and its appearance is then as shown in Figure 12. The cylinder bore 121 for the injector piston head 122 is closed by an end plate 136, with a port 137 therein. The opposite end of the cylinder bore 121 is provided with a port 138.

Mounted on the post 99 is a supporting plate 139, upon which a pair of limit switches 140 and 141 are adjustably mounted and adapted to be operated by engagement with the collar 132 (Figure 2). Similarly, the slide 56 carries a limit switch 142, adjustably mounted thereon and adapted to be engaged by a collar 143 on the piston rod 106. The limit switches 140 and 141 control the action of the geared motor unit 95 for operating the feed screw 85. The limit switch 142, however, controls the energization of solenoids 144 connected to valve rods 145 (Figure 1), for shifting the injector operating valves 146. The latter are piston type valves, and are connected by the lines 147 to the pumps 148 and 149, the suction lines 150 of which are connected by the lines 151 to the auxiliary tank 22. The valves 146 are connected by the lines 152 and 153 to the ports 137 and 138 at the opposite ends of the injector cylinder bore 121. The valves 146 are also provided with discharge lines 154, leading through the valves 155 to the auxiliary tank 22. From the pump discharge lines 147 the branch pressure lines 156 lead to the line 157 which runs, by way of the valve 158, to the port 159 (Figure 3) opening into the main cylinder chamber 38. In this manner the pressure from the pumps 148 and 149 serves to assist the clamping action of the main plunger 17.

Pressure fluid is supplied to the main cylinder 18 by means of the pump 160 having an intake line 161 from the surge tank 19, and an outlet line 162 containing a valve 163 and leading to the clamp-operating valve 164. The latter is of a piston type, similar to the valves 146, but is manually or automatically operated to discharge pressure fluid from the line 162, either into the line 165 or 166. A third line 167 leads back to the surge tank 19. The line 166, with its branches 168, leads to the forward ends of the cylinder bores 110, connecting up with the passages 113 and 115 thereof. The passages 112 and 114 are connected by the branch pipes 169 to the line 170 running to a branch line 171, leading from the platen-operated valve 172 to a junction with the line 157 near the port 159. The valve 172 is a two-way valve, operated by the control rod 173 when the platen arm 174 engages the adjustable collar 175 thereon (Figure 1).

The line 165 of the clamp-operating valve 164 runs therefrom to the platen-operated valve 172, and the additional line 176 runs from the line 166 to a valve-operating piston within the valve 172, whereby the latter is shifted when pressure fluid reaches it along the line 176. This action is additional to the action of the platen arm 174 upon the control rod 173. From the line 165 the branch line 177 runs to the central bore 29 of the booster plunger 28, whereas a branch line 178 runs from the bored passageway 31 therein to the line 176. Also connected to the latter, as at 45, is the surge valve 20.

*Operation*

In the operation of the machine, the pumps 148, 149 and 160 are started in operation and generate pressure fluid which is transmitted to the various lines connected to these pumps. The operator now shifts the clamp-operating valve 164 so that a connection is made between the line 162 and the line 165. Pressure fluid now passes from the pump 160, through the valve 163 and line 162, the line 165 and the line 177 to the central bore 29 of the booster plunger 28, where it acts upon the end of the internal bore 26 within the main plunger 17. This causes the main plunger 17 to advance rapidly, causing the platen 15 and the upper die half 11 carried thereby, to rapidly approach the lower die half 10.

As the main plunger 17 advances in this manner, the surge valve 20 automatically opens so that fluid is drawn through the passages 49 and 50, into the upper chamber 38 of the main cylinder 18 (Figures 1 and 3), from the surge tank 19. When the die halves 11 and 10 have approached almost to the point of engagement, the platen arm 174 engages the collar 175 on the control rod 173 and shifts the two-way piston-type valve 172. When this valve shifts, pressure fluid is admitted from the pump 160, through the lines 162 and 165 to the line 171 leading to the upper chamber 38 of the main cylinder 18. This causes the pressure of the pump 160 to be exerted upon the upper end of the main plunger 17, bringing the die halves 11 and 10 into engagement with a clamping pressure of high degree. At the same time that the clamping of the die halves 11 and 10 occurs, pressure passes from the line 171, along the lines 170 and 169, to the cylinder bores 110, causing the pistons 108 and 109 thereof to move inwardly, thereby shifting the feeding and injector units 53 into engagement with the die halves 11 and 10. When this occurs the injector nozzle tips 73 engage the sockets or inlets 14 in the die halves 10 and 11, and the apparatus is in readiness for injecting plastic material into the cavities 12 of the die half 11.

As the piston rod 106 pushes the feeding and injector unit 53 into engagement with the die halves 11 and 10, its collar 143 engages and closes the limit switch 142 (Figure 2), thereby energizing the solenoids 144 and causing them to shift the injection control valves 146. When this occurs pressure fluid passes from the pumps 148 and 149, through the lines 147, the valves 146 and the lines 152, to the ports 137 in the injector cylinder bores 121, causing the pistons 122 to move the injector plungers 125 inward and execute an injection stroke of each unit. The plastic material, which has been heated in the injector chamber 67, is thus pushed past the deflector 69, and through the orifice 72 into the cavities 12 of the die halves 11 and 10. The limit switches 140 and 141 come into play at this point to operate the geared motor unit 95 so as to cause the feed screws 85 to rotate and feed more of the particles of molding material from the feed chamber 84 into the injector chamber 67. These limit switches 140 and 141 are connected to an electrical circuit, forming no part of the present invention, but disclosed and claimed in the copending application of Ernst and Lawyer, Ser. No. 136,904, filed April 26, 1937, now Patent No. 2,191,882, issue Feb. 27, 1940.

By the operation of these limit switches 140 and 141 the feed screw 85 is caused to feed a slight excess of material into the injector chamber 67 so that an adequate amount of material is always present in the chamber. As a surplus amount of material collects therein the injector plunger 125 is incapable of executing a complete injection stroke, hence, the collar 132 is temporarily incapable of engaging and actuating the limit switch 141. The electrical circuit then remains deenergized, and the feed screw 85 remains inactive and skips a cycle while the injector plunger 125 executes another injection stroke and clears the injector chamber 67 of the surplus material.

Meanwhile, the pumps 148 and 149 supply pressure fluid through the lines 156 and 157 to the upper chamber 38 of the main cylinder 18, thereby assisting the pump 160 to maintain a firm clamping pressure upon the main plunger 17 and to overcome such slight leakage as may occur. After the material has been allowed to cool in the die halves 11 and 10 for a sufficient length of time, the injector operating valves 146 are shifted by the operator so that pressure fluid passes from the pumps 148 and 149, through the lines 147 and 153, to the ports 138, thereby returning the injector operating piston 122 to its starting position. Fluid from the opposite sides of the pistons 122 returns through the ports 137 and lines 152 and 154, through the valve 146 to the auxiliary tank 22. The clamp-operating valve 164 is also shifted, thereby permitting pressure fluid to pass from the pump 160 and its pressure line 162, through the lines 166, 176 and 178, to the passageway 31 leading to the pull-back side of the piston head 30 on the booster plunger 28. This causes the main plunger 17 to rise and return to its starting position, separating the die halves 10 and 11.

At the same time the pressure fluid continues along the line 176 to the connection 45, and operates the surge valve 20 so that it opens and permits the fluid from the upper chamber 38 of the main cylinder 18 to pass through the passages 50 and 49, back into the surge tank 19 (Figure 3). The pressure fluid continues through the line 176 and acts against the operating piston within the piston valve 172, thereby holding the valve 172 forcibly open, although the platen arm 174 has released the collar 175 on the control rod 173. During the same operation, pressure fluid passes from the line 166, through the branch lines 168, into the passages 113 and 115 at the ends of the cylinder bores 110 and 111, causing the pistons 108 and 109 to shift the feeding and injector units 53 out of engagement with the die half 10. The feeding and injector units 53 thereby return to their starting positions, and the fluid displaced by the pistons 108 and 109 passes through the passages 112 and 114, through the lines 169, 170 and 171, through the two-way valve 172, which is now being held open forcibly by fluid reaching its operating piston through the line 176. The fluid from the valve 172 continues along the line 165, through the valve 164 and the line 167, to the surge tank 19. The machine is now in readiness for executing another clamping and injection cycle.

In the course of time it may become necessary to take up the wear and looseness existing between the slides 56 and the guide plate 57. When this occurs the gibs 179 and 180 (Figures 7 and 8) may be moved by means of the screws 181 and 182, thereby taking up any amount of play. If a double unit is employed, as in Figure 8, the principle is the same, except that the slides 56 are engaged by the members 183 (Figure 8) secured to the guide plate 57 by the screws 184. The members 183 interlock in the manner shown in Figure 9.

It will be understood that we desire to comprehend within this invention such modifications as come within the scope of the claims and the invention.

Having thus fully described our invention, what we claim as new and desire to secure by Letters Patent, is:

1. In combination in a plastic injection molding machine, a plurality of die elements, a hydraulic motor for moving one of said dies into engagement with the other die, an injector, a second hydraulic motor for moving said injector into engagement with at least one of said dies, a main liquid tank disposed above said dies, an auxiliary liquid tank disposed remote from said main tank and below said main tank, a hydraulic connection between said main tank and said auxiliary tank, and a plurality of pumps, one of said pumps being arranged to withdraw liquid from the main tank and supply it to said die motor, means to permit rapid gravity flow of liquid from said main tank to said die motor without effecting the liquid level in said auxiliary tank, and another of said pumps being arranged to withdraw liquid from the undisturbed liquid supply in said auxiliary tank and supply it to said injector motor.

2. In combination in a plastic injection molding machine, a plurality of dies, a hydraulic motor for moving one of said dies into engagement with the other die, an injector feeding unit, a hydraulic motor for moving said unit into engagement with said dies, an injector cylinder and piston carried by said unit, a hydraulic motor for causing operation of said injection piston to eject material from said cylinder into said dies, a main liquid tank disposed above said dies, an auxiliary liquid tank disposed remote from said main tank and below said main tank, a hydraulic connection between said tanks, and a plurality of pumps, one of said pumps being arranged to withdraw liquid from said main tank and supply it to said die motor, means to permit rapid gravity flow of liquid from said main tank to said die motor without effecting the liquid level in said auxiliary tank, and means to shift a portion of said pump supply to said feeding unit motor to advance said feeding unit into engagement with said dies, and another of said pumps being arranged to withdraw liquid from the undisturbed liquid supply in said auxiliary tank and supply it to said injector motor.

3. In combination in a plastic injection molding machine, a pair of die elements having a mold cavity, means for closing said dies, a plurality of injection units each unit comprising a cylinder and a nozzle in coaxial alignment and arranged in planar alignment with the parting plane of said dies, the nozzles thereof engaging the parting line of the dies, said units being distributed around said dies in a manner that material ejected therefrom will flow from the outside toward the center of the mold cavity.

4. In combination in a plastic injection molding machine, a pair of die elements having a mold cavity, means for closing said dies, a plurality of injection units each unit comprising a cylinder and a nozzle in coaxial alignment and arranged in planar alignment with the parting plane of said dies, the nozzles thereof engaging the parting line of the dies, said units being positioned adjacent opposite sides of said dies so that material ejected therefrom will flow from the outside toward the center of the mold cavity.

5. In combination in a plastic injection molding machine, a pair of die elements having a mold cavity, means for closing said die, a plurality of injection units each unit comprising a cylinder and a nozzle in coaxial alignment and arranged in planar alignment with the parting plane of said dies, the nozzles thereof engaging the parting line of the dies, said units being distributed around said dies in a manner that material concommitantly ejected therefrom will flow from the outside toward the center of the mold cavity.

6. In combination in a plastic injection molding machine, a pair of die elements having a mold cavity, means for closing said dies, a plurality of independently operable injection feeding units each unit including a cylinder and a nozzle in coaxial alignment and arranged in planar alignment with the parting plane of said dies, the nozzles thereof engaging the parting line of the dies, said units being distributed around said dies in a manner that material ejected therefrom will flow from the outside toward the center of the mold cavity.

JOHAN A. MULLER.
WARREN R. TUCKER.